United States Patent Office 3,697,471
Patented Oct. 10, 1972

3,697,471
POLYESTER IMIDE RESIN LACQUERS
Karl Schmidt, Ferdinand Hansch, Hans-Malte Rombrecht, and Hans-Joachim Beck, Hamburg, Germany, assignors to Dr. Beck & Co. AG, Hamburg, Germany
No Drawing. Continuation of application Ser. No. 238,315, Nov. 2, 1962. This application Aug. 8, 1967, Ser. No. 659,234
Claims priority, application Germany, Nov. 2, 1961, P 12 686.5–43; Dec. 12, 1961, P 14 45 263.2; July 6, 1962, P 14 95 100.9
Int. Cl. C08g 20/32, 51/34
U.S. Cl. 260—33.4 P                22 Claims

ABSTRACT OF THE DISCLOSURE

Polyester imide resin having ester groups of acid and alcohol moieties in the chain, and also in the chain a content of 5-membered imide rings of the general formula:

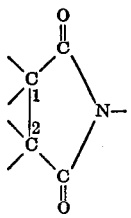

The resin is soluble in cresol solvents and can be combined with such solvents to form a lacquer suitable for enameling of wire.

---

This application is a continuation of application Ser. No. 238,315, filed Nov. 2, 1962, now abandoned.

The present invention relates to polyester resins, and more particularly to polyester resins which in addition to the ester groups also contain imide groups, and also to a new series of imide group-containing agents which can be used to modify polyester resins.

Synthetic resins produced from polyvalent alcohols and polycarboxylic acids have been known for a long time. These are generally known under the designation "alkyd resins" and provide one of the most important classes of synthetic resins. Alkyd resins have also been known to be modified in various ways, primarily by the incorporation of natural or synthetic fatty acids or their glycerides therein. The particularly temperature stable alkyd resins are however the oil-free alkyd resins of aromatic carboxylic acids, especially of isophthalic acid and terephthalic acid.

Alkyd resins have also been modified by the incorporation therein of nitrogen-containing compounds, for example by the use therein of diamines, amino alcohols or amino carboxylic acids which are reacted with the reactants used for forming the alkyd resins, or by the subsequent reaction of the alkyd resins with polyisocyanates. Products obtained in this manner exhibit improved elasticity and good temperature stability. However, these resins also do not meet all of the necessary requirements for all applications.

For some time linear polyimide resins have been known, these having been obtained by the condensation of diamines with tetracarboxylic acid anhydrides. These resins are marked by an extremely high softening temperature and duration of stability to high temperatures, as well as by a high stability against all normal solvents. This latter advantage actually makes it difficult to make use of and work up these linear polyimide resins. Attempts have been made to avoid this advantage by first producing the linear polyimidocarboxylic acid which is only soluble in relatively expensive solvents and then the polyimidocarboxylic acid after the fashioning thereof, for example as a lacquer coating, fibers or the like, by heating or splitting off of water by means of suitable chemicals to subsequently convert the same into a polyimide. However, polyimidocarboxylic acids can only be made into lacquers in the form of solutions with a very low solid body content, because concentrated solutions thereof possess too high a viscosity for working up. A further disadvantage of the polyimidocarboxylic acids resides in the fact that the same cannot be contacted with iron, and consequently considerable apparatus expense in the use of expensive noble metals is necessary in order to work with the substances.

It is accordingly a primary object of the present invention to provide a new series of resins which possess advantages not possessed by the above mentioned resins, and which consequently can be used for various important technical purposes.

It is another object of the present invention to provide new polyester imide resins of superior characteristics.

It is yet another object of the present invention to provide for the modification of polyester resins or alkyd resins of all types, and particularly of alkyd resins produced from aromatic polycarboxylic acids, so as to improve the properties thereof.

It is another object of the present invention to provide a new series of modifying agents for the modification of polyester resins, these modifying agents being usable either during or after the production of the polyester resins.

It is still another object of the present invention to provide methods of producing the new polyester imide resins of the present invention.

It is still another object of the present invention to provide lacquers of polyester imide resins for use in various applications, and particularly for use as lacquers for the coating of magnetic wire and the like electrical conductors.

It is still a further object of the present invention to provide insulated electrical conductors which are insulated by means of the polyester imide resins of the present invention.

Other objects and advantages of the present invention will be apparent from a further reading of the specification and of the appended claims.

With the above and other objects in view, the present invention mainly comprises the modification of a polyester resin so that the same contains at least one 5-member imide ring between functional groups of the molecule. Thus, in accordance with the present invention there is provided ester imide resins, particularly polyester resins of one or more polycarboxylic acid and one or more polyvalent alcohol, as well as hydroxy carboxylic acids, and also as well as the use of the functionally active derivatives of the polycarboxylic acids and of the polyvalent alcohols, in which one or more of the starting materials contains one or more 5-membered imide ring between the functional groups of the molecule.

The 5-membered imide ring is of the formula

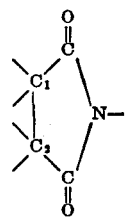

in which $C_1$ and $C_2$ are part of an aromatic system. The ring is part of a polymer chain.

It has surprisingly been found that ester imide resins, which contain not only ester groups but also imide groups, on the one hand contain many properties which are better than those of the known alkyd resins, and on the other hand avoid the difficulties of the polyimide resins. This is accomplished by producing the ester imide resins of polycarboxylic acids, polyvalent alcohols, including hydroxy carboxylic acids or their derivatives, wherein one or more of the starting substances is partly or entirely of such compound that there is one or more 5-membered imide ring between the functional groups of the molecule.

Thus, for example, enameled lacquer films of the ester imide resins of the present invention possess marked thermal stability, increased solvent resistance, hardness and flexibility. Particularly notable are the improvements in the action of the combined mechanical and thermal stresses, such as in the thermal ageing of stretched or compressed lacquer films. Because of these advantageous properties, the products of the present invention are particularly suitable for the production of enameling, particularly for magnetic wires for electrical insulation purposes, since for these purposes materials possessing all of the superior properties of the products of the present invention were not known. Thus, lacquer films of good resistance in the so-called heat shock test were unknown. Also of importance for the use of the resins of the present invention as lacquers for magnetic wires or for electrical insulation purposes is the solubility thereof in cheap solvents such as cresols, or if necessary in mixtures of cutting agents or diluents, such as solvent naphtha. In accordance with the present invention it is possible to produce low viscosity lacquers of high solid body content.

It should also be noted that the ester imide resins of the present invention in the use thereof for enameling lacquers can be improved by the addition of esters of titanic acid or of zirconic acid.

The combination of the advantageous properties of the polyimide resins and of the polyester resins in the new polyester imide resins of the present invention could not be predicted, particularly with respect to the suitable use thereof in the field of electrical insulation of conductors such as copper wires. It is thus quite surprising that even with a slight content of imide groups the properties of the ester imide resins of the present invention is markedly influenced. The use of the ester imide resins of the present invention is, however, not limited to application for electrical insulation purposes. These resins can also be used for all other purposes for which the known alkyd resins could be used, particularly for all types of coatings, for the production of foils and films, and also for production of molded bodies.

As indicated above, the production of the ester imide resins according to the present invention is carried out by esterifying a polycarboxylic acid (or its functional derivatives) with a polyhydric alcohol as well as with a hydroxy carboxylic acid, if desired, in known manner, whereby in accordance with the present invention one or more of these starting substances contains between the functional groups in the molecule one or more 5-membered imide group. As is clear from the above instead of using the acids or alcohols themselves it is possible to use instead their functional derivatives, such as their esters or semi-esters.

The imide group-containing starting materials of the desired structure which are used for the production of the ester imide resins of the present invention can, for example, be produced by reaction between compounds of the following two classes:

(a) An aromatic carboxylic acid anhydride which besides the 5-membered cyclic carboxylic acid anhydride group also contains at least one additional reactable group. These additional reactable groups can be carboxyl groups, an additional carboxylic acid anhydride group or a hydroxyl group.

In this class of compounds there can be used also, instead of the cyclic carboxylic acid anhydride groups, compounds in which two adjacent carbon atoms contain carboxyl groups, or to use their esters or semi- or half esters, as well as their semi- or half imides with a primary amine of the type set forth under (b) below. Any of these compounds of this type can be used for the imide formation.

(b) A primary amine, which besides the primary amino group also contains at least one additional reactable group. These additional reactable groups can be carboxyl groups, a hydroxyl group, or an additional primary amino group.

Instead of the primary amines it is possible to use their salts, amides, lactams or polyamides, so long as the bound primary amino group is reactable for imide formation.

Examples of compounds of a cyclic carboxylic acid anhydride grouping and an additional functional group falling under (a) above, are primarily pyromellitic acid anhydride and trimellitic acid anhydride. In addition other carboxylic acid anhydrides are suitable, such as naphthalene tetracarboxylic acid dianhydride or dianhydrides of tetracarboxylic acid with two benzene nucleii in the molecule in which the carboxyl groups are in 3,3',4,4'-position.

Examples of compounds with a primary amino group and an additional functional group falling under (b) above, are primarily the aliphatic diprimary diamines such as ethylenediamine, tetramethylenediamine, hexamethylenediamine, nonamethylenediamine, as well as aromatic diprimary diamines such as benzidine, diaminodiphenylmethane, diaminodiphenylketone, diaminodiphenylsulfone, diaminodiphenylsulfoxide, diaminodiphenylether and diaminodiphenylthioether, phenylenediamine, toluylenediamine, xylylenediamine, as well as diamines with three benzene nucleii in the molecule, such as bis(4-aminophenyl)-α,α'-p-xylol or bis-(4-aminophenoxy)-1,4-benzene, and also cycloaliphatic diamines, such as 4,4-dicyclohexylmethanediamine. Also suitable are amino alcohols such as monoethanolamine, monopropanolamine aminophenyl)-α,α'-p-xylol or bis(4-aminophenoxy)-1,4-acids such as glycol, aminopropionic acids, amino capronic acids or amino benzoic acids.

Where the primary amino group of starting material (b) is an aromatic amino group, the 5-membered imide ring and the aromatic group of the amine are combined as shown in the formula:

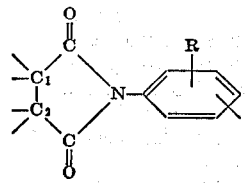

wherein R is hydrogen or methyl.

The reaction products of (a) and (b) above can be reacted with polyester reactants, e.g. a polycarboxylic acid such as terephthalic acid and a polyhydric alcohol or alcohols such as ethylene glycol and/or glycerin to form the ester imide resins of the present invention, or the compounds of (a) and (b) above can be reacted together with the polyester-forming reactants, or a polyester may be reacted with the reaction product of (a) and (b) above or with the compounds of (a) and (b) above themselves. All of these methods of proceeding can be used to produce the ester imide resins of the present invention, as will be further detailed below.

It should be noted that throughout the specification and claims of this case whenever mention is made of a reactable group such as a carboxyl group or the like it is possible to use not only the free functional group itself, but to use its functionally active equivalent, e.g. the ester, instead. Thus, for example, mention may be made of the reaction of terephthalic acid with a polyhydric alcohol to form the polyester. It is apparent that instead of the terephthalic acid itself it is possible, and sometimes even desirable to use its functional equivalents such as a lower dialkyl ester thereof, e.g. dimethyl terephthalate, diethyl terephthalate or the like, or also to use a semi- or half ester such as methyl terephthalate. The use of such functional equivalents which are in general well known in this art is meant to be comprehended within the scope of the present invention, and in this connection too, it should be noted that this discussion applies not only to the functional derivatives of the carboxylic acids, but also of the amines, etc.

Among the most suitable imide group-containing starting materials for the production of ester imide resins according to the present invention are those obtained by the reaction of 2 mols of trimellitic acid anhydride (or its reactable derivatives or functional equivalents) with 1 mol of a diprimary amine (or its reactable derivatives or functional equivalents). The result of this reaction is a diamidodicarboxylic acid which may be used to form the ester imide resins of the present invention.

Likewise suitable is the monoimidedicarboxylic acid obtained by the reaction of 1 mol of trimellitic acid anhydride with 1 mol of an amino carboxylic acid.

A suitable diamidodicarboxylic acid for the production of ester imide resins of the present invention can be obtained by the reaction of 1 mol of a tetracarboxylic acid dianhydride, such as pyromellitic acid dianhydride, with 2 mols of an amino carboxylic acid with primary amino groups or their functional equivalents.

A particularly suitable diimide alcohol which can be used as an imide group-containing starting material for the production of the ester imide resins of the present invention may be obtained by reacting 1 mol of a tetracarboxylic acid anhydride such as pyromellitic acid dianhydride with 2 mols of an amino alcohol with primary amino groups.

A suitable monoimide hydroxy carboxylic acid which may be used according to the present invention may be obtained by the reaction of 1 mol of trimellitic acid anhydride with 1 mol of an amino alcohol with primary amino groups.

In general, for the formation of cyclic imide compounds it is desirable that the used amount of the acid anhydride component (a) and of the amine component (b) are at least approximately equivalent.

As is clear from the above the imide group-containing starting material can be obtained by the reaction of an acid component (a) such as trimellitic acid anhydride and an amine component (b) such as a diprimary diamine or an amino carboxylic acid with primary amino groups, or instead of the trimellitic acid anhydride it is possible to use as the acid component (a) a tetracarboxylic acid dianhydride such as pyromellitic acid dianhydride. Instead of the diprimary diamine or the amino carboxylic acid it is equally possible to use an amino alcohol with primary amino groups.

It should also be noted that instead of using a single acid component or a single amine component for the formation of the imide group-containing starting material it is possible, and sometimes even desirable, to use a mixture of such components. Thus, for example, it is advantageous to use instead of trimellitic acid anhydride itself, a mixture of trimellitic acid anhydride with up to 40% thereof substituted by an equivalent amount of pyromellitic acid anhydride. Likewise, it is possible to substitute, for example, up to 30% of a monoalkanolamine with an equivalent amount of a diprimary amine which can either be an aliphatic, aromatic or aliphatic-aromatic diamine.

A particularly advantageous ester imide resin may be produced by the reaction of 1 mol of trimellitic acid anhydride with 0.35–0.8 mol of monoethanolamine and 0.2–2 mols of ethylene glycol. As indicated above, the trimellitic acid may be substituted in part by pyromellitic acid and the monoethanolamine may be substituted in part by an equivalent amount of a diprimary diamine. In addition, the ethylene glycol may be substituted in part, for example up to about 0.4 mol thereof, calculated with respect to 1 mol of trimellitic acid anhydride, with an equivalent amount of a trihydric alcohol, or an alcohol with 4 or more hydroxyl groups.

The following Examples A–H and J–M relate to the production of imide group-containing starting materials for the production of ester imide resins according to the present invention. The scope of the invention is, of course, not meant to be limited to these specific examples.

EXAMPLE A 115 g. (0.6 mol) of trimellitic acid anhydride are introduced into 500 g. of a technical cresol mixture at a temperature of 150° C. When all of the trimellitic acid anhydride has been dissolved, 60 g. (0.3 mol) of 4,4'-diaminodiphenyl methane are added thereto. This mixture is stirred for 6 hours at 140° C.

Upon cooling a yellowish, finely crystalline precipitate forms which is filtered off and washed several times with alcohol and ether.

The obtained product does not melt at temperatures up to 360° C.

EXAMPLE B 24.8 g. (0.1 mol) of 4,4'-diaminodiphenyl sulfone and 38.4 g. (0.2 mol) of trimellitic acid anhydride are stirred into 500 g. of technical cresol mixture to form a slurry, and this slurry is heated for 4 hours at 175° C. After cooling there is obtained a white, crystalline precipitate which is washed as described in Example A.

The product does not melt at temperatures up to 360° C.

EXAMPLE C 32.4 g. (0.3 mol) of p-phenylenediamine and 115.2 g. (0.6 mol) of trimellitic acid anhydride are heated with 1200 g. of technical cresol mixture for 4 hours at 180° C. After cooling the mixture is filtered and the green crystals constituting the obtained reaction product are washed as described in Example A.

The product does not melt at temperatures up to 360° C.

EXAMPLE D 23.2 g. (0.2 mol) of hexamethylenediamine and 76.8 g. (0.4 mol) of trimellitic acid anhydride are heated for 3 hours at 190° C. in 400 g. of a technical cresol mixture. After cooling and filtering the obtained white crystals are washed with alcohol and ether.

The melting point of the product is 301° C.

EXAMPLE E 20 g. (0.1 mol) of 4,4'-diaminodiphenyl ether and 38.4 g. (0.2 mol) of trimellitic acid anhydride are heated for 4 hours at 200° C. and 500 g. of technical cresol mixture, whereby a portion of the cresol is distilled off. After cooling and filtering the obtained brown crystals are washed with alcohol and ether.

The product does not melt at below 360° C.

EXAMPLE F 334 g. (2.44 mols) of p-aminobenzoic acid are dissolved in 1700 cc. of warm technical cresol mixture. This solution is added to a warm solution of 446 g. (2.44 mols) of trimellitic acid anhydride in 1300 cc. of technical cresol. These combined solutions are then heated to refluxing for 1 hour. After cooling and filtering the very finely granular white powder is washed with alcohol and ether.

The product does not melt at below 360° C.

Titration of the acid in dimethyl formamide with water free sodium methylate solution with cresol red as indicated gives an equivalent weight of 153 (calculated value 155.5).

EXAMPLE G 75 g. (1 mol) of glycocol and 500 cc. of technical cresol are heated to 100° C. To the obtained suspension is added in small portions 109 g. (0.5 mol) of pyromellitic acid anhydride. The mixture is then further heated to 200° C., whereby water distills off. After cooling the finely crystalline residue is filtered off and washed with methylene chloride. After recrystallization from 1,4-dioxane the product which is obtained is in the form of yellowish-white crystals and does not melt up to temperatures of 320° C.

EXAMPLE H 334 g. (2.44 mols) of p-aminobenzoic acid is dissolved under warming in 1300 cc. of technical cresol mixture and the solution is added to a hot solution of 266 g. (1.22 mols) of pyromellitic acid dianhydride in 800 cc. of cresol. The mixture is heated for 5 hours at 190° C., whereby 50 cc. of water distilled off. The precipitated white precipitate is filtered off after cooling and washed with methanol and water.

EXAMPLE J 75 g. (1 mol) of glycocol are mixed with 200 g. of technical cresol to form a slurry and 192 g. (1 mol) of trimellitic acid anhydride are added to the suspension warmed to a temperature of 100° C. Upon heating of the mixture water distills off and at 200° C. a clear solution is obtained from which a yellowish precipitate falls upon cooling.

The obtained suspension is stirred with a large amount of acetone and the insoluble portion is separated by filtration.

The obtained yellowish white crystalline powder melts at 257° C.

EXAMPLE K 218 g. (1 mol) of pyromellitic acid anhydride are dissolved in 400 cc. of dimethyl formamide at 80° C. under nitrogen atmosphere. Monoethanolamine is slowly added dropwise to this solution at the same temperature in an amount of 122 g. (2 mols). The dimethyl formamide is subsequently distilled off under vacuum at a temperature between 100 and 120° C. The dirty white residue is recrystallized with the addition of activated carbon from 1,4-dioxane, whereby finely yellowish-white crystals having a melting point of 271° C. are obtained.

EXAMPLE L 218 g. (1 mol) of pyromellitic acid dianhydride and 150 g. (2 mols) of 3-aminopropanol are mixed with each other as described in Example H. The obtained crude product is recrystallized from ethylene glycol monomethyl ether with the addition of activated carbon. The obtained white crystalline powder melts at 234° C.

EXAMPLE M 192 g. (1 mol) of trimellitic acid anhydride are dissolved under nitrogen atmosphere at 100° C. in dimethyl formamide and there is added dropwise to the solution at 60° C. 61 g. (1.0 mol) of monoethanolamine. The solvent is subsequently distilled off under vacuum at temperatures of 100–130° C. The yellowish-white residue is recrystallized two times from dioxane with the addition of activated carbon, and the compounds melts at 197° C.

Instead of producing the imide group-containing compounds as described in the previous examples, to isolate the same and then to use them as starting compounds for the production of the ester imide resins according to the present invention, it is also possible, as indicated previously, to produce the imide group-containing compounds during the synthesis of the ester imide resins and to directly react the same with the polyester reactants. Essentially the same type of ester imide resins are obtained if the imide group-containing compounds are not first separately produced and isolated, but instead the compounds (a) and (b) are permitted to react in the apparatus used for the production of the ester imide resin and then directly permitted to react with the other starting materials used in the production of the ester imide resin.

The point of time at which the compounds (a) and (b) are brought to reaction is not essential. In many cases it is preferable to first produce the imide group-containing compounds by reacting (a) and (b) and then to use the resulting compound in the further production of the ester imide resin by adding this compound to the esterification reactants. It is also possible, however, to first esterify the imide group-free starting substances with each other, then to add the reaction product of compounds (a) and (b) thereto and to react these together and subsequently to cause the resulting imide group-containing compound to react with the already formed polyester resin. On the other hand it is also possible and sometimes advantageous to mix the compounds (a) and (b) with the other starting materials used for the production of the ester imide resins together and then to react all of the components together.

The following examples are given to illustrate the production and working up of the ester imine resins of the present invention. The scope of the invention is not, however, means to be limited to the specific details of these examples.

EXAMPLE 1

A polyester is produced in known manner from 388 g. of dimethyl terephthalate, 112 g. of ethylene glycol and 75 g. of glycerin and this polyester is mixed in two portions with 137 g. of the reaction product of Example A at a temperature of 180–215° C. After the diimidedicarboxylic acid (reaction product as Example A) has been completely taken up in the terephthalic acid resin, 1.8 g. of cadmium acetate is added thereto. The reaction mixture is subsequently further condensed for 3 hours at 215° C., finally under vacuum. The thus obtained resin is dissolved in 450 g. of technical cresol while still hot and this solution is reacted with a solution of 9 g. of butyl titanate in 27 g. of cresol.

The resulting lacquer is then diluted with a mixture of 2 parts of solvent naphtha and 1 part of cresol to a solid body content of 37% and the resulting lacquer has a viscosity according to DIN 53211 with a 4 mm. nozzle at 20° C. of 156 seconds. (The expression "DIN" stands for Deutsche Industrienormalien, which is the German Industrial Standards.)

Copper wire of 1 mm. diameter is lacquered in a continuous process with this wire lacquer in accordance with the following technical data: Horizontal wire lacquering oven of 3.50 meters length, oven temperature 470° C., coating apparatus of rollers and felt, 6 coats, drawing speed of 4 m./min., coating thickness (=increase of diameter of the wire) 0.05 mm.

The testing of the lacquer insulation gives the following values.

lead pencil hardness: 4–5 H
lead pencil hardness after 30 minutes storage at 60° C. in benzene: 3 H
lead pencil hardness after 30 minutes storage at 60° C. in alcohol: 3 H
heat shock test: a winding of the wire around its own diameter is unobjectionable after 1 hour of heating at a temperature of 155° C.

After 24 hours of ageing at 180° C. the lacquer elongation amounts to 34%. The insulation is and remains solid upon winding about its own diameter under a tension load of 0.6 kp./mm.$^2$ (kp.=kilopond).

EXAMPLE 2

A polyester is produced in known manner from 388 g. of dimethyl terephthalate, 112 g. of ethylene glycol and 75 g. of glycerin, and mixed with 204 g. of the reaction product of Example A at a temperature of 180–215° C., in two portions. After the diimidodicarboxylic acid (of Example A) is completely taken up in the terephthalate resin, 1.0 g. of cadmium acetate is added thereto and the reaction mixture is further condensed for 3 hours at 215° C., finally under vacuum. The obtained resin is dissolved in 450 g. of technical cresol while still hot, and mixed with a solution of 9 g. of butyl titanate in 27 g. of cresol.

This lacquer is diluted to a solid body content of 34% and a viscosity of 120 seconds as described in Example 1, and copper wire is lacquered therewith.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire on its own diameter remains free of faults after 1 hour heating at 155° C.

After 16 hours of ageing at 200° C. the elongation of the lacquer is 22%. The insulation remains solid upon winding about 4 times its own diameter under a tension load of 6 kp./mm.$^2$.

EXAMPLE 3

A polyester is produced in known manner from 388 g. of dimethyl terephthalate, 112 g. of ethylene glycol and 75 g. of glycerin, and mixed with 273 g. of the reaction product of Example A, added thereto in two portions at a temperature of 180–215° C. Subsequently the reaction product is worked up as described in Example 1, the obtained lacquer is diluted to a solid body content of 27% and the viscosity of 55 seconds, and copper wire is lacquered therewith.

The testing of the insulation of the lacquer gives the following values.

lead pencil hardness: 4 H
lead pencil hardness after 30 minutes storage at 60° C. in benzene: 2–3 H
lead pencil hardness after 30 minutes storage at 60° C. in alcohol: 2–3 H
heat shock test: a winding of the wire about its own diameter of the wire prestretched 10% is free of faults after 1 hour of tempering at 155° C.

After 24 hours of ageing at 180° C. the elongation of the lacquer amounts to 30%. The insulation remains solid upon winding about its own diameter under a tension load of 0.6 kg./mm.$^2$.

EXAMPLE 4

A polyester produced in known manner from 388 g. of dimethyl terephthalate, 112 g. of ethylene glycol and 75 g. of glycerin has 80 g. of technical cresol added thereto and the mixture is heated to 80° C. 144 g. of trimellitic acid anhydride and 74 g. of 4,4'-diaminodiphenyl methane is then added to the resin melt and the temperature is slowly increased to 215° C. At 140° C. the resin melt becomes turbid and highly viscous, obviously due to the formation and separation of the diimidodicarboxylic acid of Example A.

Upon further temperature increase the reaction mixture slowly becomes thinly liquid again and the precipitated diimidodicarboxylic acid is gradually taken up by the resin melt. After the resin melt reaches a temperature of 215° C. it becomes clear, then 1 g. of cadmium acetate is added thereto and the cresol is distilled off under vacuum at 155° C. The reaction mixture is further condensed finally for an additional 3 hours at 215° C. The obtained resin is further worked up according to Example 1 to a lacquer of 34% solid body content and the viscosity of 108 seconds, and a copper wire is then enameled therewith.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire about its own diameter is free of faults after 1 hour of tempering at 155° C.

After 16 hours storage at 200° C. the elongation of the lacquer amounts to 23%. The insulation is solid upon winding about 4 times its own diameter under a tension load of 6 kp./mm.$^2$.

EXAMPLE 5

388 g. of dimethyl terephthalate, 112 g. of ethylene glycol, 75 g. of glycerin, 150 g. of technical cresol mixture, 144 g. of trimellitic acid anhydride and 74 g. of 4,4'-diaminodiphenyl methane are melted together with the addition of 1 g. of cerium naphthenate and stirred while heating. At about 130° C. the separation of the diimidodicarboxylic acid described in Example 1 starts. Upon further slow temperature increase methanol and water distill off. Upon reaching a temperature of 215° C. the temperature is maintained for 3 hours and the resulting resin melt becomes clear. 1 g. of cadmium acetate is added thereto, the cresol is distilled off under vacuum at a temperature of 175° C., and finally condensation is continued for an additional 3 hours at 225° C.

The obtained resin is worked up as described in Example 1 to a lacquer of 34% solid body content and a viscosity of 120 seconds, and copper wire is enameled therewith.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 2 H
heat shock test: a winding of the wire about its own diameter is free of faults after tempering for 1 hour at 155° C.

After 16 hours of ageing at 200° C. the lacquer elongation amounts to 21%. The insulation remains solid upon winding about 4 times its own diameter under a tension load of 6 kp./mm.$^2$.

EXAMPLE 6

144 g. of trimellitic acid anhydride, 74 g. of 4,4'-diaminodiphenyl methane, and 500 g. of technical cresol are heated under vigorous stirring, whereby the resulting suspension at 150° C. becomes highly viscous. Upon further temperature increase to 195° C. 27 cc of water distills off. Subsequently 200 cc. of cresol distills off at 120° C. under vacuum.

To the suspension of diimidodicarboxylic acid resulting therefrom is added 388 g. of dimethyl terephthalate, 112 g. of ethylene glycol and 75 g. of glycerin along with 1 g. of cerium naphthenate. The mixture is heated, whereupon methanol and water distill off. The temperature is then increased to 215° C. and maintained at this temperature until the resin melt becomes clear. After the addition of 1 g. of cadmium acetate the remaining cresol is distilled off under vacuum at 170° C. and the resin melt is further condensed an additional 3 hours at 215° C.

The remaining resin is further worked up as described in Example 1 to a lacquer of 34% solid body content and a viscosity of 112 seconds, and copper wire is lacquered therewith.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire about its own diameter is free of faults after 1 hour of tempering at 155° C.

After 16 hours of ageing at 200° C. the lacquer elongation amounts to 24%.
The insulation remains solid upon winding about 4 times its own diameter under a tension load of 6 kp./mm.²

EXAMPLE 7

A polyester produced in known manner from 353 g. of dimethyl terephthalate, 153 g. of ethylene glycol and 88 g. glycerin is heated to 80° C. with the addition of 52 g. of cresol. After the further addition of 200 g. of trimellitic acid anhydride and 103 g. of 4,4'-diaminodiphenylmethane the reaction mixture is further heated, whereby at a temperature of 140° C. the diimidodicarboxylic acid of Example A separates. After further temperature increase esterification occurs at 215° C., until the resin becomes clear. After the addition of 350 g. of technical cresol the mixture is cooled to 80° C.

Thereupon 299 g. of trimellitic acid anhydride and 154 g. of 4,4'-diaminodiphenylmethane are again added and the mixture is further esterified at 215° C. until a clear resin melt is obtained. The obtained product is dissolved in 1100 g. of cresol and 600 g. of solvent naphtha and the mixture of 20 g. of butyl titanate and 60 g. of cresol are added to this solution.

This solution is diluted to a solid body content of 27% and a viscosity of 123 seconds as described in Example 1 and copper wire is lacquered therewith.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire about its own temperature remains free of faults after 1 hour of tempering at 200° C.

After 16 hours of ageing at 200° C. the lacquer elongation amounts to 20%. The insulation remains solid upon winding about 4 times its own diameter under a tension load of 6 kp./mm.²

EXAMPLE 8

218 g. of diimidodicarboxylic acid produced according to Example A, 13 g. of trimellitic acid anhydride, 31 g. of ethylene glycol, 12 g. of glycerin and 1 g. of tin (II) oxalate in 500 g. of technical cresol for 8 hours at 185° C. 225 g. of cresol are then distilled off and the residue is heated for an additional 8 hours at 200° C. The obtained resin solution is diluted to a lacquer of 27% solid body content and the viscosity of 120 seconds as described in Example 1 and copper wire is lacquered therewith.

The testing of the lacquer insulation gives the following values.

lead pencil hardness: 4 H
lead pencil hardness after 30 minutes storage at 60° C. in benzene: 3–4 H
lead pencil hardness after 30 minutes storage at 60° C. in alcohol: 3–4 H
heat shock test: a winding of the wire about its own diameter is free of faults after 1 hour of tempering at 250° C.

After 16 hours of ageing at 200° C. the lacquer elongation amounts to 27%. The insulation remains solid upon winding about 4 times its own diameter under a tension load of 6 kp./mm.²

EXAMPLE 9

546 g. of diimidodicarboxylic acid of Example A, 43.5 g. of ethylene glycol and 43.5 g. of glycerin, as well as 2 g. of tin (II) oxalate and 2 g. of antimony (III) oxide are heated in 1000 g. of o-cresol for 8 hours at 185° C., whereby the reaction water is distilled off. Subsequently 740 g. of cresol are distilled off and the residue is heated for 6 hours at 200° C. The obtained resin solution is diluted as described in Example 1 to a lacquer of 29% solid body content and a viscosity of 123 seconds, and copper wire is lacquered therewith.

The testing of the lacquer insulation gives the following values.

lead pencil hardness: 4 H
lead pencil hardness after 30 minutes storage at 60° C. in benzene: 3–4 H
lead pencil hardness after 30 minutes storage at 60° C. in alcohol: 3–4 H
heat shock test: a winding of the wire about its own diameter is free of faults after 1 hour of tempering at 250° C.

After 16 hours of ageing at 200° C. the lacquer elongation amounts to 33%. The insulation is solid upon winding about 4 times its own diameter under a tension load of 6 kp./mm.²

EXAMPLE 10

The procedure followed is as described in Example 2 with the exception that instead of 204 g. of the diimidodicarboxylic acid of Example A, there is used 171 g. of the diimidodicarboxylic acid of Example D. The obtained lacquer has a solid body content of 34% and a viscosity of 110 seconds. Copper wire is lacquered therewith.

The testing of the lacquer insulation gives the following values.

lead pencil hardness: 3 H
lead pencil hardness after 30 minutes storage at 60° C. in benzene: 2 H
lead pencil hardness after 30 minutes storage at 60° C. in alcohol: 2 H
heat shock test: a winding of the wire about its own diameter remains free of faults after 1 hour heating at 155° C. A winding of the wire about 2 times its own diameter remains free of faults after 1 hour of tempering at 200° C.

After 16 hours of ageing at 200° C. the lacquer elongation amounts to 23%. The insulation remains solid upon winding about 4 times its own diameter under a tension load of 6 kp./mm.²

EXAMPLE 11

A polyester is produced from 364 g. of dimethyl terephthalate, 112 g. of ethylene glycol and 75 g. of glycerin and further worked up as described in Example 1, with the exception that instead of 137 g. of the diimidodicarboxylic acid (of Example A) there is used 156 g. of the reaction product of Example F. The obtained lacquer has a solid body content of 26% and a viscosity of 130 seconds and is used for the lacquering of wire as described in Example 1.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire prestretched 10% about its own diameter remains free of faults after 1 hour of tempering at 155° C.

After 24 hours of ageing at 180° C. the lacquer elongation amounts to 32%. The insulation remains solid upon winding about its own diameter under a tension load of 0.6 kp./mm.$^2$.

EXAMPLE 12

A polyester is produced in known manner from 388 g. of dimethyl terephthalate, 112 g. of ethylene glycol and 75 g. of glycerin are further worked up as described in Example 1. However, instead of the 137 g. of diimidodicarboxylic acid of Example A there is used 125 g. of the reaction product of Example G. The obtained lacquer has a solid body content of 33% and a viscosity of 111 seconds and copper wire is lacquered therewith as described in Example 1.

The testing of the lacquer insulation gives the following values.

lead pencil hardness: 4 H
lead pencil hardness after 30 minutes storage at 60° C. in benzene: 3–4 H
lead pencil hardness after 30 minutes storage at 60° C. in alcohol: 3–4 H
heat shock test: a winding of the wire about its own diameter remains free of faults after 1 hour of tempering at 155° C.

After 16 hours of ageing at 200° C. the insulation remains solid upon winding about 4 times its own diameter under a tension load of 6 kp./mm.$^2$.

EXAMPLE 13

218 g. of dimethyl terephthalate, 28 g. of ethylene glycol, 46 g. of glycerin and 102 g. of the reaction product of Example K, with the addition of 1 g. of cerium naphthenate and 0.4 g. of cadmium acetate, are esterified for 12 hours. During this period the temperature is gradually increased from 160° C. to 240° C. As a result the methanol bound to the dimethyl terephthalate distills off. After the end of the reaction the resin is dissolved in a mixture of 285 g. of technical cresol and 185 g. of solvent naphtha and stirred with 23 g. of a 15% solution of butyl titanate in a cresol-solvent naphtha mixture.

The obtained lacquer of 30% solid content and a viscosity of 92 seconds is used for the lacquering of copper wire as in Example 1.

The testing of the lacquer insulation gives the following values.

lead pencil hardness: 4 H
lead pencil hardness after 30 minutes storage at 60° C. in benzene: 3–4 H
lead pencil hardness after 30 minutes storage at 60° C. in alcohol: 3–4 H
heat shock test: a winding of the wire prestretched 10% about its own diameter is free of faults after 1 hour of tempering at 155° C.

After 24 hours of ageing at 180° C. the lacquer elongation amounts to 31%. The insulation is solid upon winding about its own diameter under a tension load of 0.6 kp./mm.$^2$.

EXAMPLE 14

218 g. of dimethyl terephthalate, 28 g. of ethylene glycol, 46 g. of glycerin and 111 g. of the reaction product of Example L, with the addition of 1 g. of cerium naphthenate and 0.4 g. of cadmium acetate are mixed with each other and reacted as described in Example 12. The obtained lacquer of 26% solid body content and a viscosity of 130 seconds is used for the lacquering of copper wire as described in Example 1.

The testing of the lacquer insulation gives the following values.

lead pencil hardness: 3 H
lead pencil hardness after 30 minutes storage at 60° C. in benzene: 2 H
lead pencil hardness after 30 minutes storage at 60° C. in alocohol: 2 H
heat shock test: a winding of the wire about its own diameter remains free of faults after 1 hour tempering at 155° C.

After 16 hours of ageing at 200° C. the lacquer elongation amounts to 22%. The insulation is solid upon winding about 4 times its own diameter under a tension load of 6 kp./mm.$^2$.

EXAMPLE 15

A polyester is produced from 300 g. of dimethyl terephthalate, 64 g. of ethylene glycol and 63 g. of glycerin under the addition of 65 g. of technical cresol, and 248 g. of the reaction product of Example M are added at 125° C. The temperature of 190–220° C. is used for esterification until an acid number of less than 10 is obtained. The reaction mass is subsequently further condensed an additional 90 minutes at 190–230° C. with the distillation off of cresol under vacuum.

The resulting resin melt is mixed while still hot with 450 g. of technical cresol and there is subsequently added a mixture of 11 g. of butyl titanate, 17 g. of cresol and 17 g. of solvent naphtha and thereafter it is diluted with a mixture of equal parts of cresol and solvent naphtha to a solid body content of 25% and a viscosity of 111 seconds.

A copper wire of 1 mm. diameter is lacquered with this lacquer as described in Example 1.

The testing of the lacquer insulation gives the following values.

lead pencil hardness: 4–5 H
lead pencil hardness after 30 minutes storage at 60° C. in benzene: 4 H
lead pencil hardness after 30 minutes storage at 60° C. in alcohol: 4 H
heat shock test: a winding of the wire about its own diameter remains free of faults after 1 hour of tempering at 155° C.

EXAMPLE 16

40 g. of monoethanolamine are added dropwise to a mixture of 192 g. of trimellitic acid anhydride and 500 g. of technical cresol at a temperature of 20° C. under stirring, and then 450 g. of cresol are again distilled off at 130° C. under vacuum. 65 g. of ethylene glycol are then added and the mixture is esterified at a temperature of 160–200° C. with a distillation off of water until the reaction product has an acid number of 3. Subsequently during a two hour time period an additional 50 g. of distillate are distilled off under vacuum at a temperature of 210° C.

The residue is dissolved hot in a mixture of 450 g. of cresol and 150 g. of solvent naphtha and the thus obtained solution has a solid body content of 27% and a viscosity of 135 seconds.

Copper wire of 1 mm. diameter is lacquered with this solution using a horizontal lacquering oven of 2.5 m. length and an oven temperature of 500° C. The drawing speed amounts to 2.3 m./min. Six coatings are applied, whereupon a diamter increase of the wire of 0.045 mm. is obtained.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 4 H heat shock test: a winding of the wire about its own diameter is free of faults after 1 hour of tempering at 155° C.

After 16 hours of ageing at 200° C. the insulation is solid upon winding about 4 times its own diameter under a tension load of 6 kp./mm.²

EXAMPLE 17

116 g. of trimellitic acid anhydride and 65 g. of pyromellitic acid dianhydride are dissolved in 200 g. of dimethyl formamide at a temperature of 100° C. and 43 g. of monomethanolamine are added dropwise under stirring to the solution of 60° C. 185 g. of dimethyl formamide are subsequently distilled off under vacuum at 140° C. After the addition of 56 g. of ethylene glycol the reaction mixture is esterified 7 hours at a temperature from 170° C. gradually increasing to 220° C. whereby an additional 20 g. of distillate are obtained.

The obtained resin is dissolved hot in a mixture of 380 g. of technical cresol mixture and 130 g. of solvent naphtha. The obtained lacquer has a solid body content of 38% and a viscosity of 149 seconds and is used for the lacquering of copper wire as described in Example 16.

The testing of the lacquer insulation gives the following values.

lead pencil hardness: 5 H
lead pencil hardness after 30 minutes storage at 60° C. in benzene: 4 H
lead pencil hardness after 30 minutes storage at 60° C. in alcohol: 4 H
heat shock test: a winding of the wire about its own diameter is free of faults after 1 hour tempering at 155° C.

EXAMPLE 18

192 g. of trimellitic acid anhydride are dissolved in 200 g. of dimethyl formamide at 90° C. and 30 g. of 4,4'-diaminodiphenylmethane are added in small portions to the solution at 60° C., whereby a light yellowish precipitate gradually precipitates. 28 g. of monoethanolamine are subsequently added dropwise and 170 g. of dimethyl formamide are again distilled off under vacuum at a temperature of 140° C. The residue is esterified with 64 g. of ethylene glycol for 6 hours, whereby the temperature during this time is gradually increased, 170° C. to 220° C. 25 g. of distillate are thus obtained, and upon a subsequent vacuum treatment for 90 minutes at 220° C. an additional 25 g. of distillate are obtained.

The residue is dissolved still hot in a mixture of 425 g. of technical cresol and 175 g. of solvent naphtha. The obtained lacquer has a solid body content of 33% and a viscosity of 118 seconds and is used for the lacquering of copper wires described in Example 16.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire about its own diameter is free of faults after tempering for 1 hour at 200° C.

EXAMPLE 19

A mixture of 192 g. of trimellitic acid anhydride and 200 g. of dimethyl formamide are heated to 100° C. under stirring, whereby a clear solution results. 34 g. of monoethanolamine are added thereto at 80° C. dropwise and subsequently the dimethyl formamide is distilled off at 100–150° C. under vacuum. 52 g. of neopentyl glycol and 53 g. of ethylene glycol are then added thereto and the temperature is increased gradually and evenly from 180° C. during a time period of 9 hours to 220° C. with a separation of 30 g. of distillate, the esterification being carried out until an acid number of 6 is obtained. The reaction mixture is then further condensed for 2 hours at 220° C. under vacuum.

The obtained resin is dissolved hot in a mixture of 500 g. of technical cresol and 250 g. of solvent naphtha. The lacquer has a solid body content of 28% and a viscosity of 135 seconds. The lacquer is used for the lacquering of copper wire as described in Example 16.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire about its own diameter remains free of faults after 1 hour of tempering at 155° C.

EXAMPLE 20

In accordance with the method described in Example 16 a resin is produced of the following starting components: 192 g. of trimellitic acid, 37 g. of ethylene glycol, 18 g. of glycerin and 43 g. of monoethanolamine. The obtained brown resin is dissolved hot in a mixture of 290 g. of cresol and 90 g. of solvent naphtha and the mixture is then diluted with a mixture of equal parts of cresol and solvent naphtha to a solid body content of 27% and a viscosity of 119 seconds. The lacquer is then used for the lacquering of copper wire as described in Example 16.

The testing of the lacquer insulation gives the following values.

lead pencil hardness: 4 H
lead pencil hardness after 30 minutes storage at 60° C. in benzene: 3 H
lead pencil hardness after 30 minutes storage at 60° C. in alcohol: 3 H
heat shock test: a winding of the wire about its own diameter remains free of faults after 1 hour of tempering at 155° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A lacquer comprising a polyester imide resin dissolved in an organic medium containing as an essential component thereof a cresol type solvent, said polyester imide resin having ester groups of acid and alcohol moieties in the chain which are condensation products of at least difunctional carboxylic acid and at least difunctional alcohol, and also in the chain between said ester groups, moieties of the formula:

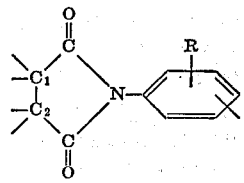

in which $C_1$ and $C_2$ are part of an aromatic ring, and R is hydrogen or methyl, moieties of said formula being present in an amount effective to improve the thermal stability of the resin without rendering the resin insoluble to an extent which would make it unsuitable for use in a wire lacquer composed of the resin dissolved in cresol and solvent naphtha.

2. A lacquer according to claim 1 suitable for lacquering of wire for electrical insulation thereof, containing cresol as an essential ingredient of the solvent.

3. An enameling lacquer according to claim 2, comprising solvent naphtha.

4. An enameling lacquer according to claim 2, said moieties of said formula being included in moieties in the chain which are condensation products of a 5-membered cyclic anhydride and a primary amine containing in addition to the primary amino group a carboxyl group, a hydroxyl group or, another primary amino group.

5. An enameling lacquer according to claim 2, said moieties of said formula being included in moieties in the chain which are condensation products of a primary amine and pyromellitic acid anhydride, trimellitic acid anhydride or dianhydrides of tetracarboxylic acids having two benzene nucleii in the molecule.

6. An enameling lacquer according to claim 2, said moieties of said formula being included in moieties in the chain which are condensation products of:
   (1) pyromellitic acid anhydride, trimellitic acid anhydride or dianhydrides of tetracarboxylic acids having two benzene nucleii in the molecule, and
   (2) benzidine, diaminodiphenylmethane, diaminodiphenylketone, diaminodiphenylsulfone, diaminodiphenylsulfoxide, diaminodiphenylether, diaminodiphenylthioether, phenylenediamine, toluylenediamine, xylylenediamine, bis-(4-aminophenyl)-α,α'-p-xylol, bis-(4-aminophenoxy)-1,4-benzene or aminobenzoic acid.

7. An enameling lacquer according to claim 2, said moieties of said formula being included in moieties in the chain which are condensation products of 2 mols of trimellitic acid anhydride with 1 mol of a diprimary diamine.

8. A lacquer according to claim 2, said moieties of said formula being included in moieties in the chain which are condensation products of:
   (1) an aromatic carboxylic acid anhydride containing a 5-membered cyclic anhydride group and at least one other functional group which is a carboxyl group, carboxylic acid anhydride group, or a hydroxyl group, and
   (2) a primary amine containing in addition to the primary amino group at least one other functional group which is a carboxyl group, a hydroxyl group, or a primary amino group.

9. A lacquer according to claim 8, wherein said primary amine (2) contains as said additional group a carboxyl group or another primary amino group.

10. A lacquer according to claim 8, wherein said aromatic carboxylic acid anhydride component (1) is pyromellitic acid anhydride, trimellitic acid anhydride or dianhydride of tetracarboxylic acid having two benzene nucleii in the molecule.

11. A lacquer according to claim 2, said moieties of said formula being included in moieties in the chain which are condensation products of:
    (a) pyromellitic acid anhydride or trimellitic acid anhydride, and
    (b) 4,4' - diaminodiphenyl methane, 4,4'-diaminodiphenyl sulfone, p-phenylenediamine, 4,4'-diaminodiphenylether, or p-aminobenzoic acid.

12. A lacquer according to claim 2, said moieties of said formula being included in moieties in the chain which are condensation products of:
    (a) pyromellitic acid anhydride or trimellitic acid anhydride, and
    (b) 4,4'-diamino-diphenyl methane, or p-aminobenzoic acid.

13. A lacquer according to claim 2, said moieities of said formula being included in moieties in the chain which are condensation products of:
    (a) pyromellitic acid anhydride or trimellitic acid anhydride, and
    (b) 4,4'-diamino-diphenyl methane.

14. A lacquer according to claim 2, said moieties of said formula being included in moieties in the chain which are condensation products of:
    (1) two moles of trimellitic acid anhydride, and
    (2) one mole of 4,4'-diaminodiphenyl methane.

15. A lacquer according to claim 2, the alcohol moieties including residues of polyhydric alcohols having more than two hydroxy groups.

16. An enameling lacquer according to claim 15, said alcohol moieties including residues of ethylene glycol.

17. A lacquer according to claim 2, the alcohol moieties including residues of polyhydric alcohols having three hydroxy groups.

18. A lacquer according to claim 2, the alcohol moieties including residues of glycerine.

19. An enameling lacquer according to claim 2, said alcohol moieties including residues of ethylene glycol.

20. An enameling lacquer according to claim 19, said alcohol moieties including residues of alcohols having three hydroxy groups.

21. An enameling lacquer according to claim 2, said alcohol moieties including residues of alcohols having only two functional groups.

22. An enameling lacquer according to claim 21, said alcohol moieties including residues of alcohols having more than two hydroxy groups.

References Cited

UNITED STATES PATENTS

| | | | |
|---|---|---|---|
| 2,710,853 | 6/1955 | Edwards et al. | 260—78 |
| 2,856,385 | 10/1958 | Van Der Berghe et al. | 260—75 N |
| 3,238,181 | 3/1966 | Anderson | 260—75 N |
| 2,502,576 | 4/1950 | Lincoln et al. | 260—78 |
| 2,609,348 | 9/1952 | De Puls et al. | 260—22 |
| 2,421,024 | 5/1947 | Frosch | 117—128.4 |
| 2,523,999 | 9/1950 | Sattler et al. | 117—128.4 |
| 3,051,724 | 8/1962 | Bolton et al. | 117—132 B |
| 3,060,191 | 10/1962 | Kolb et al. | 260—78 TF |

FOREIGN PATENTS

| | | | |
|---|---|---|---|
| 1,036,426 | 8/1959 | Germany | 260—75 N |
| 1,256,203 | 2/1961 | France | 260—78 |
| 570,858 | 7/1945 | Great Britain | 260—78 TF |

ALLAN LIEBERMAN, Primary Examiner

U.S. Cl. X.R.

117—128.4; 260—33.6 R, 47 CP, 75 N, 75 T, 78 TF

UNITED STATES PATENT OFFICE
CERTIFICATE OF CORRECTION

Patent No. 3,697,471      Dated  October 10, 1972

Inventor(s)  Karl Schmidt et al.

It is certified that error appears in the above-identified patent and that said Letters Patent are hereby corrected as shown below:

Col. 4, line 42, change "aminophenyl)-α,α'-p-xylol or bis (4-aminophenoxy)-1,4- acids such as glycol," to -- or dimethylethanolamine, as well as amino carboxylic acids such as glycocol, --.

Col. 8, line 24, change "means" to -- meant--.

Signed and sealed this 1st day of May 1973.

(SEAL)
Attest:

EDWARD M. FLETCHER, JR.            ROBERT GOTTSCHALK
Attesting Officer                  Commissioner of Patents

UNITED STATES PATENT AND TRADEMARK OFFICE
CERTIFICATE OF CORRECTION

PATENT NO. : 3,697,471
DATED : October 10, 1972
INVENTOR(S) : Karl Schmidt et al.

It is certified that error appears in the above-identified patent and that said Letters Patent are hereby corrected as shown below:

Re the foreign application priority data, the number of the German application filed November 2, 1961 given in the patent is incorrect. The correct number is 12 09 686.

Signed and Sealed this

Twenty-ninth Day of December 1981

[SEAL]

Attest:

GERALD J. MOSSINGHOFF

*Attesting Officer*    *Commissioner of Patents and Trademarks*